Sept. 10, 1940.                    W. ZEINDLER                    2,214,005
                            HOISTING AND LIFTING TRUCK
                            Filed Nov. 4, 1939              2 Sheets-Sheet 1

INVENTOR.
Werner Zeindler
BY Earl & Chappell
ATTORNEYS

Sept. 10, 1940.  W. ZEINDLER  2,214,005
HOISTING AND LIFTING TRUCK
Filed Nov. 4, 1939  2 Sheets-Sheet 2

INVENTOR.
Werner Zeindler
BY Earl D. Chappell
ATTORNEYS

Patented Sept. 10, 1940

2,214,005

UNITED STATES PATENT OFFICE 2,214,005

HOISTING AND LIFTING TRUCK

Werner Zeindler, Albion, Mich., assignor to The Service Caster and Truck Company, Albion, Mich., a corporation of Michigan Application November 4, 1939, Serial No. 302,860

24 Claims. (Cl. 254—5)

This invention relates to improvements in hoisting and lifting trucks.

The main objects of this invention are:

First, to provide an improved hoisting or lifting truck which is capable of lifting the load with a comparatively small amount of physical exertion on the part of the operator.

Second, to provide a lifting or hoisting truck in which the parts are so supported and arranged that the load resistance remains substantially constant throughout the lifting stroke.

Third, to provide a lifting or hoisting truck in which the parts are so arranged that the hoisting or lifting stresses thereon are such as not to impose undue stress at some point during the lifting movement.

Fourth, to provide a hoisting truck in which a very high percentage of the applied power is effective in lifting the load.

Fifth, to provide a structure embodying these advantages which is comparatively simple and very strong and durable.

Objects relating to details and economies of the invention will appear from the description to follow. The invention is defined and pointed out in the claims.

Preferred embodiments of the invention are illustrated in the accompanying drawings, in which:

Fig. 5 is a fragmentary view partially in vertical section corresponding to the section of Fig. 2 of a modified form or embodiment of the invention.

Fig. 6 is a fragmentary view partially in section on line 6—6 of Fig. 5.

Figure 1:
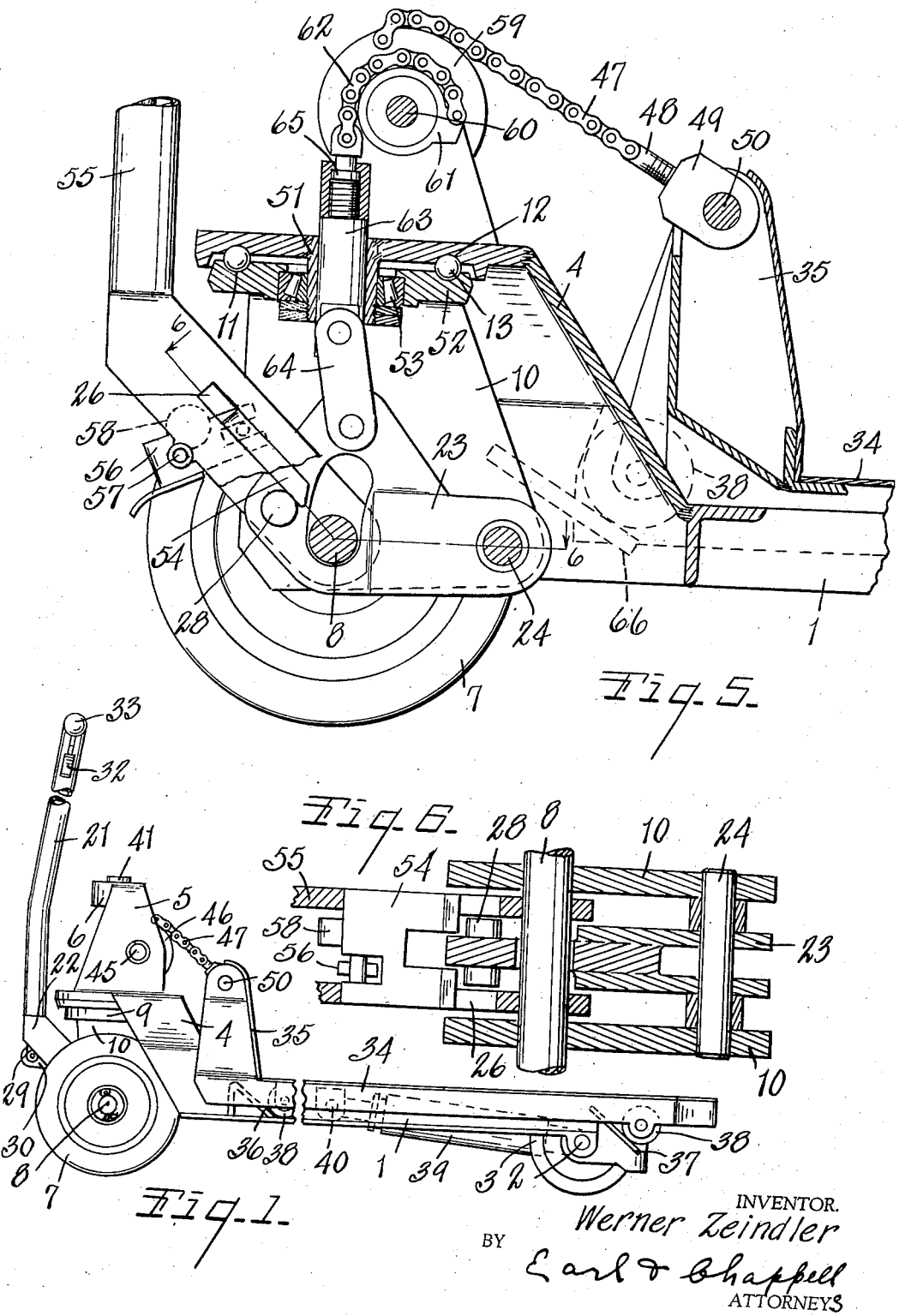
Fig. 1 is a fragmentary side elevation of a lifting truck embodying the features of this invention with the hoisting platform in its lowered or unactuated position.

The embodiments of my invention illustrated comprise a carriage frame 1 having a rear axle 2 and rear carrying wheels 3. This carriage frame is provided with an elevated or upwardly offset forwardly projecting bolster 4 having spaced uprights 5 thereon connected at the top by the crosspiece 6. This bolster or head member 4 of the frame and the frame are fabricated of suitable metal parts and are preferably joined together by welding as is indicated in the drawings. However, I have not attempted to show structural details of the carriage frame.

The front steering wheels 7 are provided with an axle 8. This axle is carried by the front wheel support or caster head 9 having spaced depending plate-like hanger members 10 through which the axle is disposed, the wheels being mounted on the outer sides of these members 10.

The front axle support or caster member 9 is provided with an annular ball race 11 while the bolster 4 is provided with an opposed ball race 12 for the coacting anti-friction ball bearings 13. This bearing constitutes a load carrying truck bearing between the carriage frame and the front axle support and consequently the front axle and the wheels thereof.

The member 9 is provided with a tubular king bolt or pin 14 which is disposed through an opening 15 in the bolster member 4 and rotatably supported in the bolster member 4 by the roller bearing assembly designated generally by the numeral 16. This bearing assembly is arranged in an upwardly facing shouldered recess 17 provided therefor in the member 4 and the parts are retained by the bearing closure disk 18 and the nuts 19 and 20 threaded upon the upper end of the king bolt, the outer nut serving as a lock nut.

The tongue 21 not only constitutes a tongue but a hoisting lever. This tongue is forked at its inner end, its forks 22 being pivotally mounted on the axle between the hanger members 10. These hanger members are preferably plate-like as shown. The rear end of the lever 23 is pivoted at 24 between these plates, the lever being positioned between the forks of the tongue. The lever is provided with a segmental slot 25 receiving the axle 8, the slot permitting the vertical reciprocatory movement of the lever.

Figure 2:
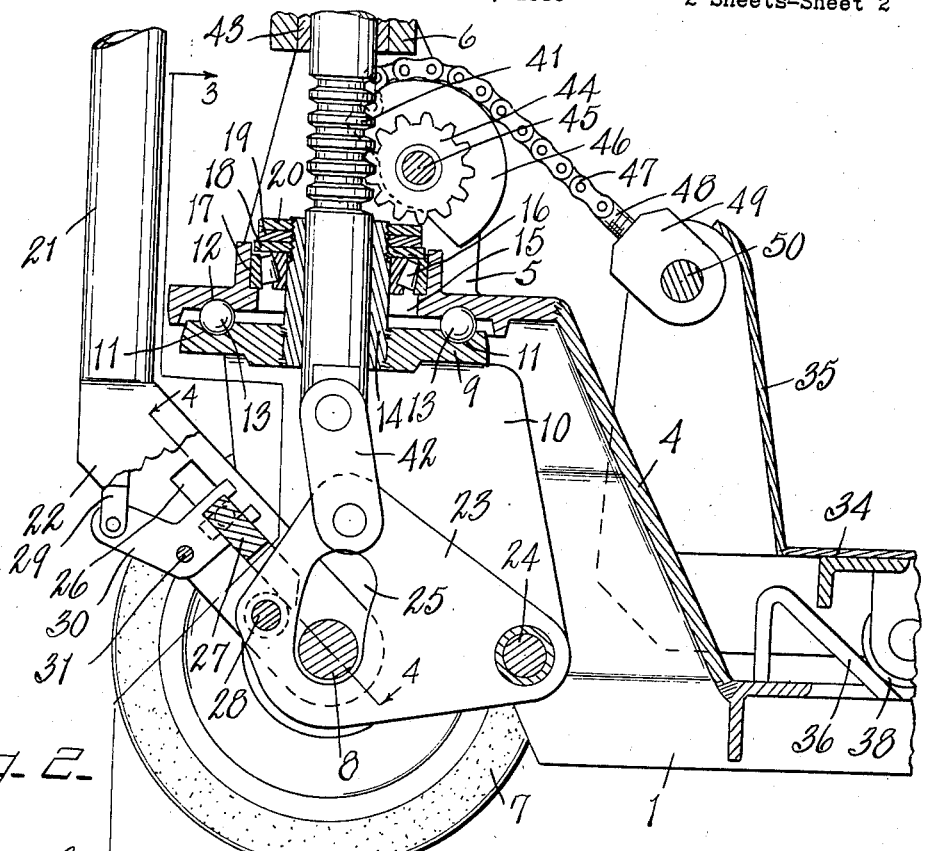
Fig. 2 is an enlarged fragmentary view partially in vertical section on line 2—2 of Fig. 3.
Figures 3, 4:
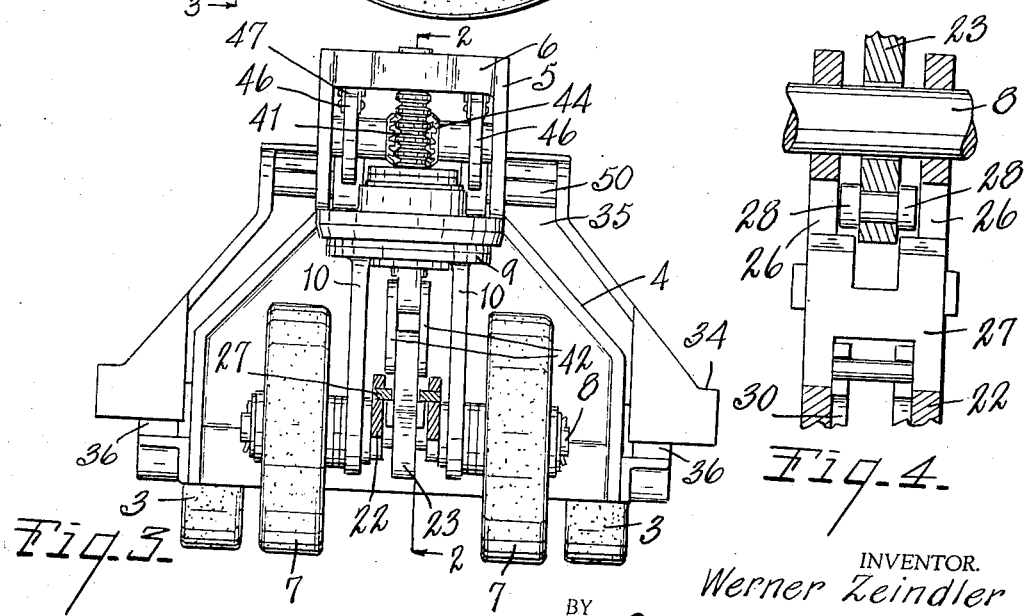
Fig. 3 is a front view partially in section on the broken line 3—3 of Fig. 2.
Fig. 4 is a fragmentary view partially in section on line 4—4 of Fig. 2.

To detachably connect the tongue to the lever, I provide the forks of the lever with longitudinal slots 26 in which the pawl or dog 27 is slidably mounted so as to be moved into engagement with the coacting members 28 on the sides of the lever, see Figs. 2, 3 and 4. The pawl is controlled from the manually operable control rod 29 which is arranged longitudinally of the tubular tongue, its lower end being connected to the bell crank lever 30 pivoted at 31 between the forks of the tongue. The rod is provided with a handpiece 32 adjacent its handle or grip 33.

The hoisting platform 34 is provided with an upright 35 at its forward end. The details of this platform—that is, its structural features so far as platform structure is concerned, are not illustrated other than the upright and the mounting for the platform. This mounting comprises inclined ways 36 and 37 with which the wheels 38 on the platform coact so that when the platform is moved forwardly, the platform is elevated.

A dashpot type of platform return check means is indicated at 39. This is adapted to sustain the load when it is released and gradually permits the platform to return to its normal or initial position. In this embodiment illustrated, one member of the return check is connected to the platform as indicated at 40 and the other to the rear axle. Return checks of this general type are known in the art and therefore are not detailed herein.

The operating connections for the platform in the embodiment illustrated in Figs. 1 to 4 inclusive comprise the tongue and lever parts described and in addition thereto the circular rack 41, the lower end of which is connected to the lever by means of the link 42. This rack 41 is reciprocatingly mounted and supported in the tubular king bolt steering post 14. The upper end of the rack is guided in a bearing 43 carried by the crosspiece 6 on the uprights 5.

The rack coacts with the pinion 44 which is angularly fixed to the shaft 45 carried by the uprights 5 and positioned so that the pinion is in mesh with the rack. On either side of the pinion the shaft is provided with a disc-like segmental drum 46 also angularly fixed to the shaft. These drums are of substantially greater diameter than the pinion and they are formed as segments for the purpose of compactness. The sides are cut away so as to effectively clear other parts.

The hoisting cables 47, in this embodiment in the form of chains, are connected at their forward ends to the drums so that the cables wind or wrap around the drums and at their rear ends to the upright 35 at the front end of the lifting or hoisting platform. The cables are provided with threaded coupling members 48 which engage the coupling members 49 pivoted on the rods 50 carried by the upright 31.

The positioning of the drums and the point of connection of the cables to the uprights or other connection to the platform is such that the hoisting reaches of the cables between the drums and the platform lie at an angle closely approximating that of the angle of inclination of the inclined ways 36, preferably however at a slightly less angle. For example, in the embodiment illustrated in Fig. 2, the angle of inclination of the ways is approximately 41° and the cables lie at an angle of approximately 40°. The result of this is that while the lifting power applied to the cables is effectively delivered to the platform there is enough variation in the angular relation of the cables to the ways so that the wheels are held to the ways and avoids tilting movement of the platform on the ways even when there is a substantial out-of-balance loading on the platform. In the embodiment illustrated, the rear ways are preferably disposed at the rear of the rear axle, thus providing compactness.

With this arrangement of parts, the power applied to the tongue is effectively multiplied so that a man of average weight and strength can hoist or elevate a very heavy load without undue exertion. Further, the parts are so arranged that the frictional losses and changes in directional application of power are relatively slight.

In the embodiment of my invention shown in Figs. 5 and 6, the carriage is substantially that described, the main change being in the provision of a depending vertical bearing 51 on the bolster or head member 4. There is a ball bearing assembly between the bolster member 4 and the axle support 52 which corresponds to the member 9 of the structure described. The radial bearing 53 in this embodiment is between the tubular bearing member 51 and the body portion of the member 52. The pawl 54 which connects the tongue 55 to the actuating lever 23 is, in this embodiment, controlled by the foot actuated control member 56 which is pivoted at 57. The weight 58 tends to hold the pawl in its actuated position, or when the member 56 is tilted to its released position, the weight holds it in such released position. The drum 59 in this embodiment is mounted on a shaft 60 which carries a second drum 61 of substantially less diameter than the drum 59. This second drum is connected by the cable 62 to the plunger 63 and the link 64 to the lever 23. The chain 62 is connected to the plunger by means of the swivel 65. In this embodiment, the forward way 66 is of somewhat different shape from that shown in the previously described embodiment and in this case the ways are arranged at an angle of approximately 31° while the reach of the cable 47 lies at an angle of approximately 30°, thus securing the same results as have been described for the previously described embodiment, namely, the holding of the platform to the ways and utilizing the hoisting pull on the cable to substantially its maximum extent.

I have illustrated and described my improvements in two embodiments which I have found to be very practical. I have not attempted to illustrate or describe other embodiments or adaptations as it is believed that this disclosure will enable those skilled in the art to embody or adapt my inventions as may be desired.

Having thus described my invention, what I claim as new and desire to secure by Letters Patent is:

1. In a lifting truck, the combination with a carriage frame provided with an elevated forwardly projecting bolster having spaced uprights with connecting crosspiece at the upper ends thereof, of rear wheels and axle therefor, front wheels and axle therefor, a front axle support comprising spaced plate-like hanger members through which the axle is disposed, the wheels being arranged on the outer sides of said hanger member, and a tubular king bolt journaled in said bolster, a wheeled platform having an upright at its forward end disposed at the rear of said bolster, said frame being provided with rearwardly inclined ways for said platform wheels disposed at the front and rear thereof with the rear ways disposed at the rear of the rear axle, a steering tongue constituting a hoisting lever and having a forked inner end pivotally mounted on said front axle between said front axle support hanger members, a lever pivotally mounted at its rear end centrally between said hanger members to project forwardly between the fork members of said tongue, said lever having a slot receiving said front axle, a manually adjustable pawl carried by said tongue for detachable engagement with said lever, a curved rack slidable in said king bolt and said crosspiece on said bolster, a link connecting said rack to said lever, a shaft journaled in said uprights on said bolster transversely of said rack, said shaft being provided with a pair of spaced drums and with a pinion between the drums coacting with said rack, and cables secured to said drums and to said upright on said platform, the positioning of the drums and the points of attachment of the cables to the upright being such that the reaches of the cables between the drums and their connection to said upright lie at an angle approximately but somewhat less than the angle of inclination of said inclined ways.

2. In a lifting truck, the combination with a carriage frame provided with an elevated forwardly projecting bolster having spaced uprights with connecting crosspiece at the upper ends thereof, of rear wheels and axle therefor, front wheels and axle therefor, a front axle support comprising spaced plate-like hanger members through which the axle is disposed, the wheels being arranged on the outer sides of said hanger member, and a tubular king bolt journaled in said bolster, a wheeled platform having an upright at its forward end disposed at the rear of said bolster, said frame being provided with rearwardly inclined ways for said platform wheels disposed at the front and rear thereof with the rear ways disposed at the rear of the rear axle, a steering tongue constituting a hoisting lever pivotally mounted on said front axle between said front axle support hanger members, a lever pivotally mounted on said hanger members, a manually adjustable pawl carried by said tongue for detachable engagement with said lever, a curved rack slidable in said king bolt and said crosspiece on said bolster, a link connecting said rack to said lever, a shaft journaled in said uprights on said bolster transversely of said rack, said shaft being provided with a pair of spaced drums and with a pinion between the drums coacting with said rack, and cables secured to said drums and to said upright on said platform, the positioning of the drums and the points of attachment of the cables to the upright being such that the reaches of the cables between the drums and their connection to said upright lie at an angle approximately but somewhat less than the angle of inclination of said inclined ways.

3. In a lifting truck, the combination with a carriage frame provided with an elevated forwardly projecting bolster having spaced uprights with connecting crosspiece at the upper ends thereof, of rear wheels and axle therefor, front wheels and axle therefor, a front axle support comprising spaced plate-like hanger members through which the axle is disposed, the wheels being arranged on the outer sides of said hanger member, and a tubular king bolt journaled in said bolster, a hoisting platform having an upright at its forward end disposed at the rear of said bolster, said frame being provided with coacting wheels and inclined ways, a steering tongue constituting a hoisting lever and having a forked inner end pivotally mounted on said front axle between said front axle support hanger members, a lever pivotally mounted at its rear end centrally between said hanger members to project forwardly between the fork members of said tongue, said lever having a slot receiving said front axle, a manually adjustable pawl carried by said tongue for detachable engagement with said lever, a curved rack slidable in said king bolt and said crosspiece on said bolster, a link connecting said rack to said lever, a shaft journaled in said uprights on said bolster transversely of said rack, said shaft being provided with a pair of spaced drums and with a pinion between the drums coacting with said rack, and cables secured to said drums and to said upright on said platform, the positioning of the drums and the points of attachment of the cables to the upright being such that the reaches of the cables between the drums and their connection to said upright lie at an angle approximately but somewhat less than the angle of inclination of said inclined ways.

4. In a lifting truck, the combination with a carriage frame provided with an elevated forwardly projecting bolster having spaced uprights with connecting cross-piece at the upper ends thereof, of rear wheels and axle therefor, front wheels and axle therefor, a front axle support comprising spaced plate-like hanger members through which the axle is disposed, the wheels being arranged on the outer sides of said hanger member, and a tubular king bolt journaled in said bolster, a hoisting platform having an upright at its forward end disposed at the rear of said bolster, said frame being provided with coacting wheels and inclined ways, a steering tongue constituting a hoisting lever pivotally mounted on said front axle between said front axle support hanger members, a lever pivotally mounted on said hanger members, a manually adjustable pawl carried by said tongue for detachable engagement with said lever, a curved rack slidable in said king bolt and said crosspiece on said bolster, a link connecting said rack to said lever, a shaft journaled in said uprights on said bolster transversely of said rack, said shaft being provided with a pair of spaced drums and with a pinion between the drums coacting with said rack, and cables secured to said drums and to said upright on said platform, the positioning of the drums and the points of attachment of the cables to the upright being such that the reaches of the cables between the drums and their connection to said upright lie at an angle approximately but somewhat less than the angle of inclination of said inclined ways.

5. In a lifting truck, the combination with a carriage provided with rear wheels and with an elevated forwardly projecting bolster, of front wheels and axle therefor, a front axle support comprising spaced hanger members and a tubular king bolt journaled in said bolster, a hoisting platform having an upright at its forward end disposed at the rear of said bolster, said platform and carriage being provided with coacting inclined ways and supporting members, a steering tongue constituting a hoisting lever pivotally mounted on said front axle between said hanger members, a lever pivotally mounted on said hanger members, means for detachably connecting said tongue and lever, a rack slidable axially of said king bolt and operatively connected to said lever, a pinion mounted on said bolster to coact with said rack and having a drum connected thereto, and a cable secured to said drum and to said upright on said platform, the positioning of the drum and the point of attachment of the cable to the upright being such that the reach of the cable between the drum and the upright lies at an angle approximately that of but of somewhat less than the angle of inclination of said inclined ways.

6. In a lifting truck, the combination with a carriage provided with a bolster and having front wheels and an axle therefor, of a front axle support having a tubular king bolt journaled in said bolster, a hoisting platform, a steering tongue constituting a hoisting lever pivotally mounted on said front axle support, a lever pivotally mounted on said support, means for detachably connecting said tongue and lever, a rack slidable axially of said king bolt and operatively connected to said lever, a pinion mounted on said bolster to coact with said rack and having a drum connected thereto, and a cable secured to said drum and to said platform.

7. In a lifting truck, the combination with a carriage provided with a bolster and having front wheels and an axle therefor, of a front axle support having a tubular king bolt journaled in said bolster, a hoisting platform, said platform and carriage being provided with coacting inclined ways and support members, a steering tongue constituting a hoisting lever pivotally mounted on said front axle support, a rack slidable axially of said king bolt, means for detachably connecting said tongue and rack, a pinion mounted on said bolster to coact with said rack and having a drum connected thereto, and a cable secured to said drum and to said platform.

8. In a lifting truck, the combination with a carriage provided with a bolster and having front wheels and axle therefor, a front axle support journaled in said bolster, a hoisting platform, said platform and carriage being provided with coacting inclined ways and members traveling thereon, a steering tongue constituting a hoisting lever pivotally carried by said front axle support, a rack slidable axially of said front axle support journal, means for operatively connecting said tongue to said rack, a pinion mounted on said bolster to coact with said rack and having a drum connected thereto, and a cable connected to said drum and to said platform, the positioning of the drum and the point of attachment of the cable to the platform being such that the reach of the cable between the drum and the platform lies at an angle approximating that of but somewhat less than the angle of inclination of said inclined ways.

9. In a lifting truck, the combination with a carriage provided with a bolster and having front wheels and axle therefor, a front axle support journaled in said bolster, a hoisting platform, a steering tongue constituting a hoisting lever pivotally carried by said front axle support, a rack slidable axially of said front axle support journal, means for operatively connecting said tongue to said rack, a pinion mounted on said bolster to coact with said rack and having a drum connected thereto, and a cable connected to said drum and to said platform.

10. In a lifting truck, the combination with a carriage provided with a bolster and having front wheels and axle therefor, a front axle support journaled in said bolster, a hoisting platform, said platform and carriage being provided with coacting inclined ways and members traveling thereon, a steering tongue constituting a hoisting lever pivotally mounted on said front axle support, a member movable axially of said front axle support journal, means for operatively connecting said tongue to such member, a drum mounted on said bolster and operatively connected to said last mentioned member, and a cable connected to said drum and to said platform, the positioning of the drum and the point of attachment of the cable to the platform being such that the reach of the cable between the drum and the platform lies at an angle approximating that of but somewhat less than the angle of inclination of said inclined ways.

11. In a lifting truck, the combination with a carriage provided with an elevated forwardly projecting bolster having spaced uprights with connecting crosspiece at the upper ends thereof, said carriage including front wheels and an axle therefor, of a front axle support provided with a tubular king bolt journaled in said bolster, a hoisting platform mounted on said carriage for hoisting adjustment thereon, a steering tongue constituting a hoisting lever pivotally carried by said front axle support, a curved rack slidable in said king bolt and said crosspiece on said bolster, operating connections for said tongue to said rack, a shaft journaled in said uprights on said bolster transversely of said rack, a pinion on said shaft coacting with said rack, a drum on said shaft, and a cable secured to said drum and to said platform.

12. In a lifting truck, the combination with a carriage provided with a bolster, said carriage including front wheels and an axle therefor, of a front axle support provided with a tubular king bolt journaled in said bolster, a hoisting platform mounted on said carriage for hoisting adjustment thereon, a steering tongue constituting a hoisting lever pivotally carried by said front axle support, a curved rack slidable axially in said king bolt, operating connections for said tongue to said rack, a pinion mounted on said bolster to coact with said rack, a drum connected to said pinion, and a cable connecting said drum to said platform.

13. In a lifting truck, the combination with a carriage provided with an elevated forwardly projecting bolster having spaced uprights with connecting crosspiece at the upper ends thereof, said carriage including front wheels and an axle therefor, of a front axle support journaled in said bolster, a hoisting platform mounted on said carriage for hoisting adjustment thereon, a steering tongue constituting a hoisting lever pivotally carried by said front axle support, a rack, operating connections for said tongue to said rack, a shaft journaled in said uprights on said bolster transversely of said rack, a pinion on said shaft coacting with said rack, a drum on said shaft, and a cable connecting said drum and said platform.

14. In a lifting truck, the combination with a carriage provided with a bolster, said carriage including front wheels and an axle therefor, of a front axle support journaled to said bolster, a hoisting platform mounted on said carriage for hoisting adjustment thereon, a steering tongue constituting a hoisting lever pivotally carried by said front axle support, a rack, operating connections for said tongue to said rack, a pinion mounted on said bolster to coact with said rack, a drum on said shaft, and a cable connecting said drum to said platform.

15. In a lifting truck, the combination with a carriage provided with a steering head unit, of a hoisting platform, said platform and carriage being provided with coacting inclined ways and carrying members associated thereon, a steering tongue constituting a hoisting lever pivotally mounted on said steering head unit, a drum mounted on said bolster, a cable connected to said drum and to said platform, the positioning of the drum and the point of attachment of the cable to the platform being such that the reach of the cable between the drum and the platform lies at an angle approximating that of the angle of inclination of said inclined ways, and means for operatively connecting said tongue to said drum.

16. In a lifting truck, the combination with a carriage, of a wheeled hoisting platform, said carriage being provided with rearwardly inclined ways for the wheels of said platform, a hoisting cable, a cable supporting drum on said carriage, the position of the drum and the point of attachment of the cable to the platform being such that the reach of the cable between the drum and the platform lies at an angle approximating that of but somewhat less than the angle of inclination of said inclined ways, a pivoted steering tongue for said carriage constituting a hoisting lever, and operating connections for said lever to said hoisting cable including a rack and pinion, the pinion being operatively connected to the drum and the rack to the tongue, the diameter of the drum being substantially greater than the diameter of the pinion.

17. In a lifting truck, the combination with a carriage, of a wheeled hoisting platform, said carriage being provided with rearwardly inclined ways for the wheels of said platform, a hoisting cable, a cable supporting drum on said carriage, the position of the drum and the point of attachment of the cable to the platform being such that the reach of the cable between the drum and the platform lies at an angle approximating that of but somewhat less than the angle of inclination of said inclined ways, a pivoted steering tongue for said carriage constituting a hoisting lever, and operating connections for said lever to said hoisting cable.

18. In a lifting truck, the combination with a carriage, of a hoisting platform, said carriage and platform being provided with coacting rearwardly inclined ways and wheels, a hoisting cable, a cable supporting drum on said carriage, the position of the drum and the point of attachment of the cable to the platform being such that the reach of the cable between the drum and the platform lies at an angle approximating that of said inclined ways, a pivoted steering tongue for said carriage constituting a hoisting lever, operating connections for said tongue to said drum including a second drum connected to the first drum and of substantially less diameter than the first named drum, and operating connections for said second named drum to said tongue.

19. In a lifting truck, the combination with a carriage, of a hoisting platform mounted thereon, said carriage and platform being provided with coacting rearwardly inclined ways and wheels, a hoisting cable, and actuating means therefor mounted on said carriage, the cable being supported on said carriage so that the hoisting reach of the cable between the cable and the platform lies at an angle approximating that of but somewhat less than the angle of inclination of said inclined ways.

20. In a lifting truck, the combination with a carriage, of a wheeled hoisting platform, said carriage being provided with rearwardly inclined ways for the wheels of the platform, a hoisting drum on said carriage, means for actuating said drum, and a cable connecting said drum to said carriage, the positioning of the drum on the carriage and the point of attachment of the cable to the platform being such that the hoisting reach of the cable between the drum and the platform lies at an angle approximating that of the inclination of said inclined ways.

21. In a lifting truck, the combination with a carriage, of a hoisting platform, said carriage and platform being provided with coacting wheels and rearwardly inclined ways, a hoisting cable, and means for supporting and actuating said cable carried by said carriage, the supporting means for the cable being positioned so that the reach of the cable between such supporting means and platform lies at an angle approximating that of but somewhat less than the angle of inclination of said inclined ways.

22. In a lifting truck, the combination with a carriage, of a hoisting platform, said carriage and platform being provided with coacting wheels and rearwardly inclined ways, a hoisting cable, and means for supporting and actuating said cable carried by said carriage, the supporting means for the cable being positioned so that the reach of the cable between such supporting means and platform lies at an angle approximating that of the angle of inclination of said inclined ways.

23. In a lifting truck, the combination with a carriage provided with a bolster and with front steering wheels and axle therefor, of a front axle support comprising spaced plate-like hanger members through which said axle is disposed, the wheels being arranged on the outer sides of said hanger members, said front axle support being vertically journaled on said bolster, a hoisting platform, a steering tongue constituting a hoisting lever pivotally mounted on said front axle between said support hanger members, a lever pivotally mounted at its rear end between said hanger members, a drum mounted on said bolster, a cable connecting said drum to said platform, means for detachably connecting said tongue to said lever, and operating connections for said lever to said drum comprising a plunger member disposed axially of the journal of said front axle support, a link connecting said plunger to said lever, a second drum connected to the first named drum and of substantially less diameter than said first named drum, and a cable connecting said second drum with said plunger.

24. In a lifting truck, the combination with a carriage provided with a bolster and with front steering wheels and axle therefor, of a front axle support vertically journaled on said bolster, a hoisting platform, a steering tongue constituting a hoisting lever pivotally mounted on said front axle support, a drum mounted on said bolster, a cable connecting said drum to said platform, operating connections for said tongue to said drum comprising a plunger member disposed axially of the journal of said front axle support, a second drum connected to the first named drum and of substantially less diameter than said first named drum, and a cable connecting said second drum with said plunger.

WERNER ZEINDLER.